United States Patent [19]
Werling et al.

[11] Patent Number: 6,082,408
[45] Date of Patent: Jul. 4, 2000

[54] MODULAR AIR TANK ASSEMBLY

[75] Inventors: Donald L. Werling; James A. Thomas, both of Fort Wayne, Ind.

[73] Assignee: Navistar International Transportation Corp, Chicago, Ill.

[21] Appl. No.: 09/158,726

[22] Filed: Sep. 22, 1998

[51] Int. Cl.$^7$ .................................................. B60R 11/00
[52] U.S. Cl. ........................................................ 137/899.4
[58] Field of Search .......................... 280/760; 137/899.4

[56] References Cited

U.S. PATENT DOCUMENTS

| | | | |
|---|---|---|---|
| 5,593,167 | 1/1997 | Barnhardt et al. | 280/164.1 |
| 5,749,391 | 5/1998 | Loutzenhiser | 137/204 |

*Primary Examiner*—Henry J. Recla
*Assistant Examiner*—Peter deVore
*Attorney, Agent, or Firm*—Jeffrey P. Calfa; Dennis Kelly Sullivan

[57] ABSTRACT

A modular air tank assembly for a mobile vehicle such as a heavy duty highway tractor trailer truck and the process of assembling and installing the modular air tank assembly onto a vehicle. More specifically, the modular air tank assembly is comprised of two "J" shaped brackets, and one or two air tanks seated within the lower portion of the J-brackets and held in place by curved contour retaining elements. The modular air tank assembly may be assembled separate from the main vehicle assembly line and then brought to the line as a unit for installation. The modular assembly includes all tank-to-tank plumbing fittings, check valves, tank drain valves, and local drain valve operator strings which are installed to the assembly separate from the main vehicle assembly line.

23 Claims, 6 Drawing Sheets

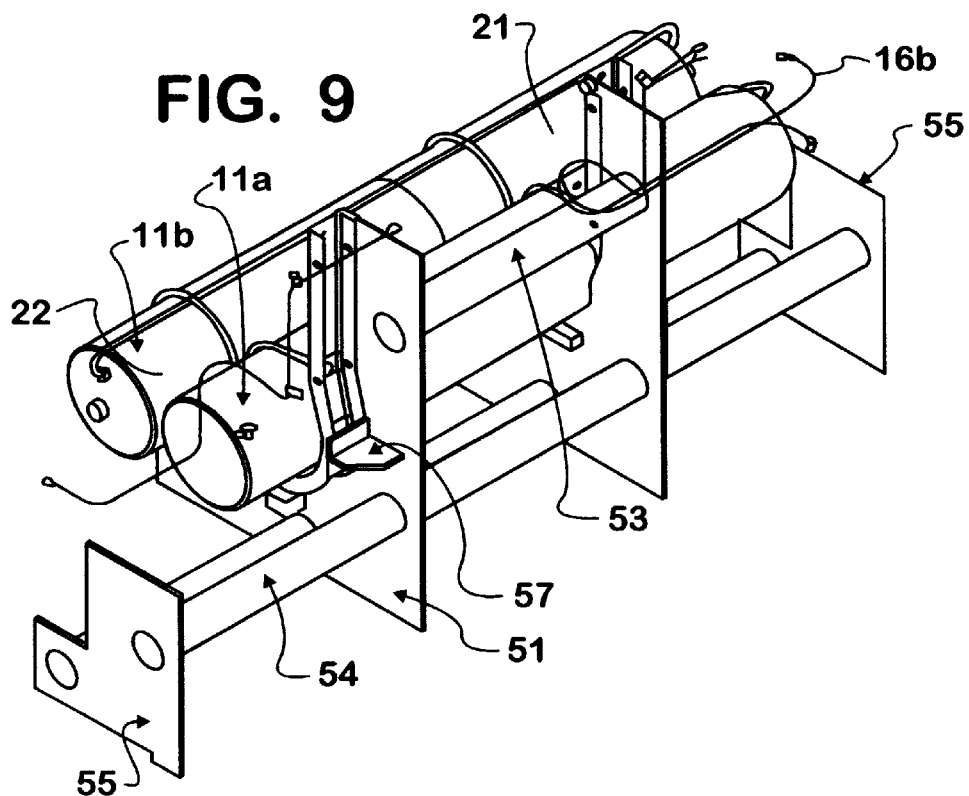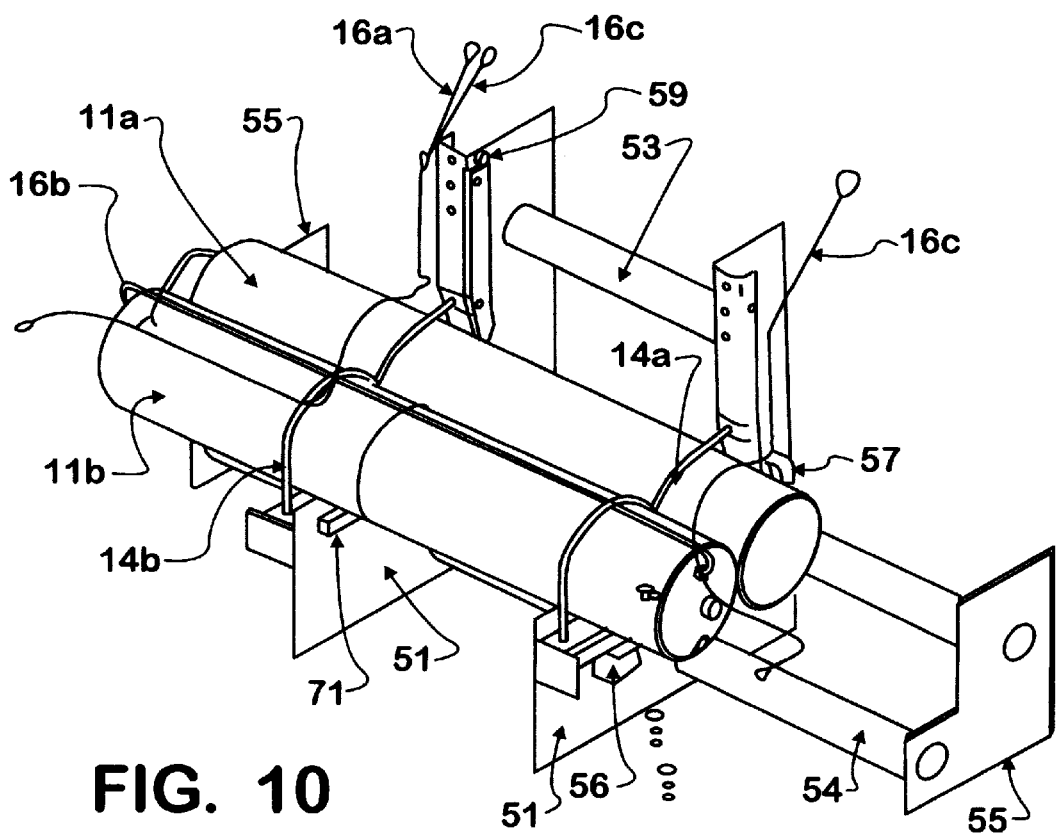

MODULAR AIR TANK ASSEMBLY

SUMMARY OF THE INVENTION

This invention relates to a modular air tank assembly for a mobile vehicle such as a heavy duty highway tractor trailer truck and the process of assembling and installing the modular air tank assembly onto a vehicle. More specifically, the modular air tank assembly is comprised of two "J" shaped brackets, and one or two air tanks seated within the lower portion of the J-brackets and held in place by curved contour retaining elements. The modular air tank assembly may be assembled separate from the main vehicle assembly line and then brought to the line as a unit for installation.

PRIOR ART

Heavy duty trucks use air to operate the vehicle service brakes and other auxiliaries. The air is provided from a vehicle air system. The vehicle air system has an air compressor which supplies air to a wet tank. The wet tank is in fluid connection with a primary air tank and a secondary air tank through separate check valves which allow air to flow only from the wet tank to the two other tanks. Air from the primary and secondary air tanks is supplied through tubing to operate the vehicle brake system and other air operated auxiliaries.

In the prior art, the air tanks were engaged on cross struts between the vehicle fuel tank engagement assemblies. The connections to, from and between the wet primary and secondary tanks had to be performed on the assembly line following installation of the cross struts. The wet, primary and secondary air tanks had drain valves. The drain valves could be manually operated by operator pull strings which needed to be run along chassis frame rail engaged components and the frame rails themselves in order to make local manual drain valve operation possible. The drain valve operator pull strings could only be installed on the main assembly line. This installation complexity was also hindered by the fact that the tank to tank connections had to be made up in an awkward fashion under the vehicle.

As such, there is a need for a modular air tank assembly to which the air tanks may be easily assembled as a unit separate from the main vehicle assembly line including tank-to-tank plumbing, drain valves and local drain valve operator pull strings.

BRIEF DESCRIPTION OF THE INVENTION

A primary objective of this invention is to provide a modular air tank assembly which may be easily assembled separate from the main vehicle assembly line.

A second objective of the invention is to provide the tank-to-tank plumbing, drain valves, and local drain valve operator pull strings as part of the modular air tank assembly installed separate from the main vehicle assembly line.

A third object of the invention is to provide a process for installing air tanks to a vehicle which includes assembling a modular assembly separate from the main vehicle assembly line which includes the air tanks, tank-to-tank plumbing, drain valves, and local drain valve operator pull strings.

The three objectives are satisfied by a modular air tank assembly and the process of assembling and installing the modular assembly to a vehicle. The modular air tank assembly is comprised of two "J" shaped brackets and one or two air tanks which are seated within the lower curved portions of the "J" brackets. The air tanks are held to the "J" brackets by curved contour retaining elements. The modular assembly includes all tank-to-tank plumbing fittings, check valves, tank drain valves, and local drain valve operator strings which are installed to the assembly separate from the main vehicle assembly line.

BRIEF DESCRIPTION OF THE DRAWINGS

While the invention is particularly pointed out and distinctly claimed in the concluding portions, two embodiments are set forth in the following detailed description which may be best understood when read in connection with the accompanying drawings, of which:

FIG. 9 is a rear perspective of the assembly jig of FIG. 7 with an air tank assembly loaded.

FIG. 10 is a front perspective of the assembly jig of FIG. 7 with an air tank assembly loaded.

DESCRIPTION OF THE INVENTION

Figure 1:
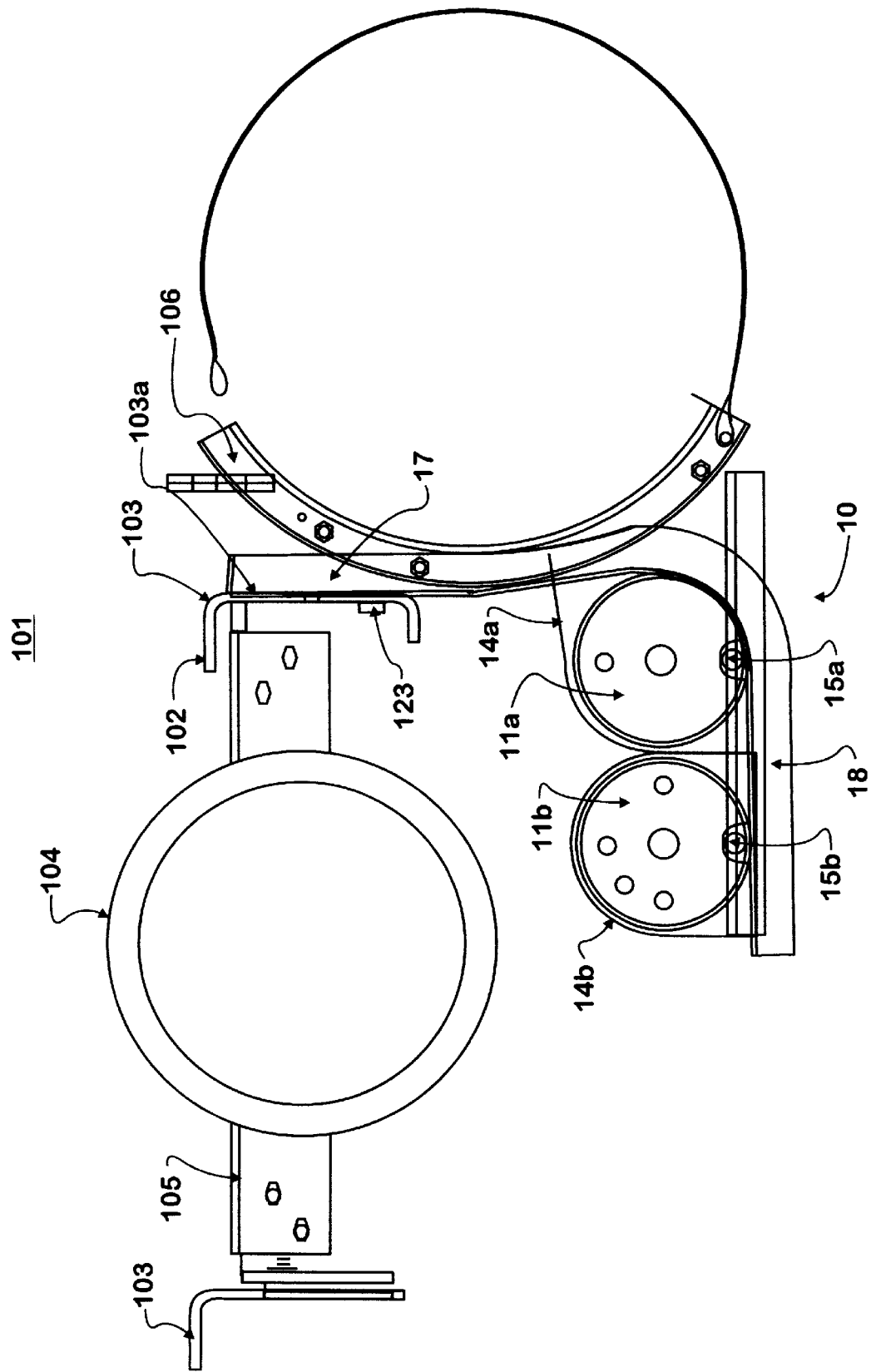
FIG. 1 is cutaway, front view of two-tank modular air tank assembly embodiment of this invention installed on a vehicle chassis.
Figure 2:
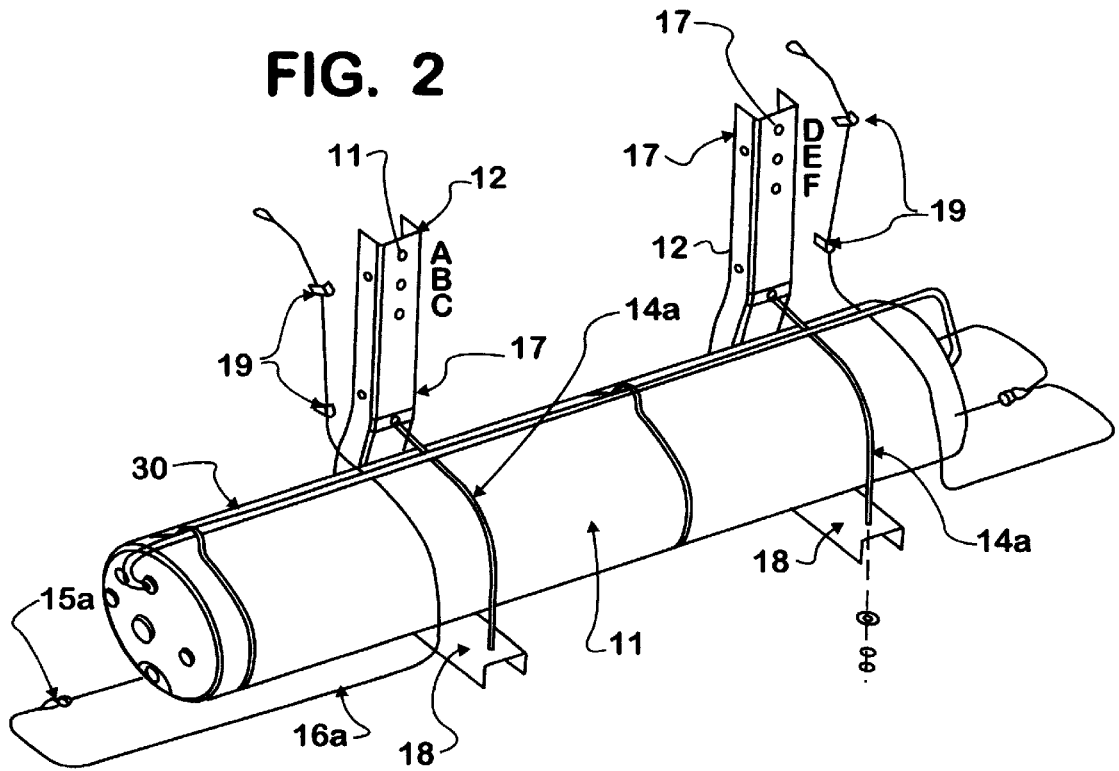
FIG. 2 is a front perspective view of a one-tank modular air tank assembly embodiment of this invention.
Figure 3:
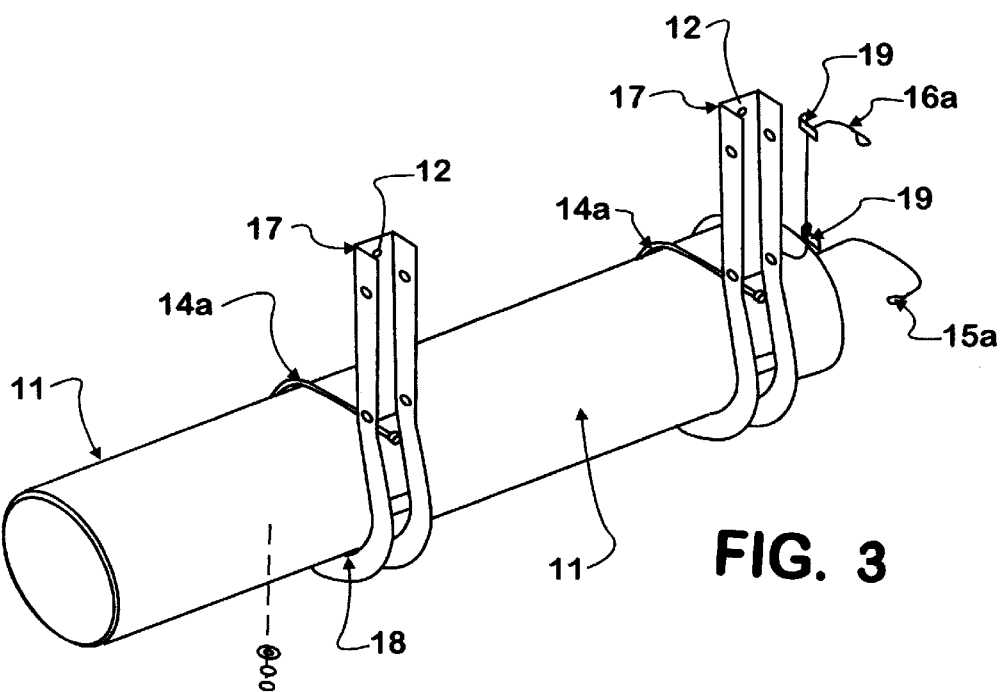
FIG. 3 is a rear perspective view of the air tank assembly of FIG. 2.
Figure 4:
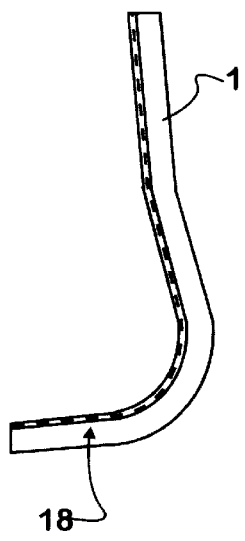
FIG. 4 is a side view of a bracket for the air tank assembly of FIG. 1.
Figure 5:
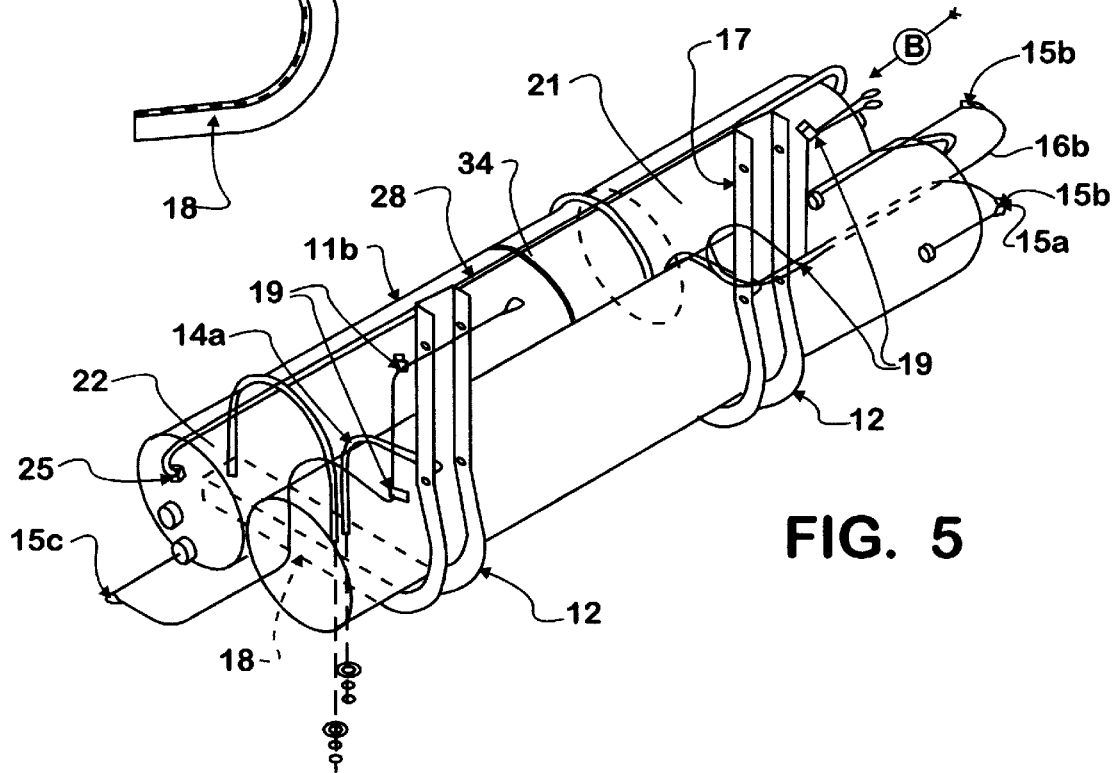
FIG. 5 is a rear perspective view of the air tank assembly of FIG. 1.
Figure 6:
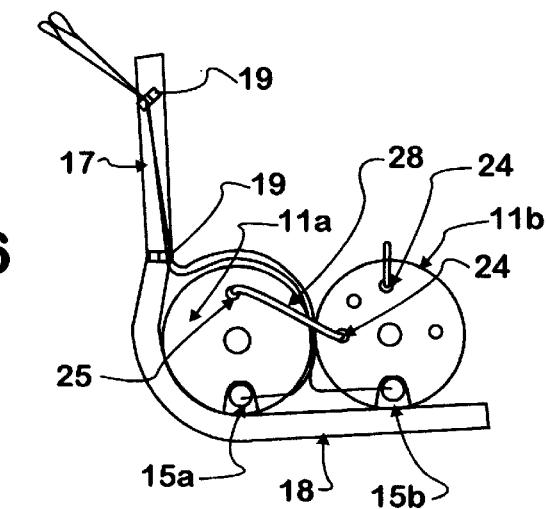
FIG. 6 is a side view of the air tank assembly of FIG. 1 uninstalled.
Figure 7:
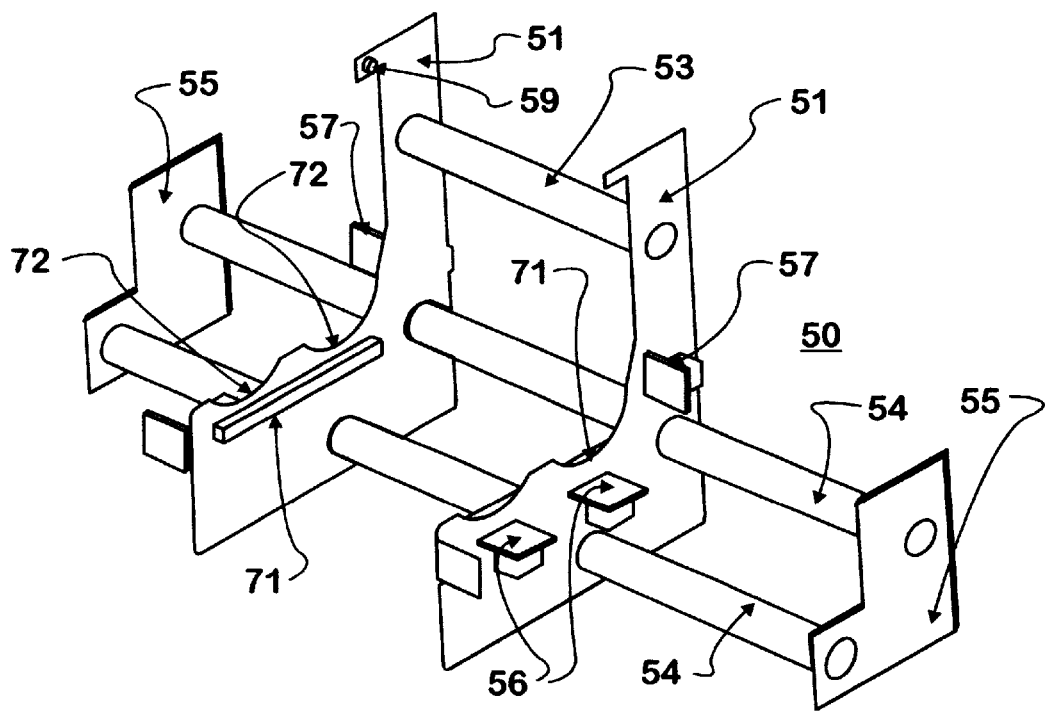
FIG. 7 is a front perspective view of an assembly jig, used for assembling the air tank assembly of FIG. 1.
Figure 8:
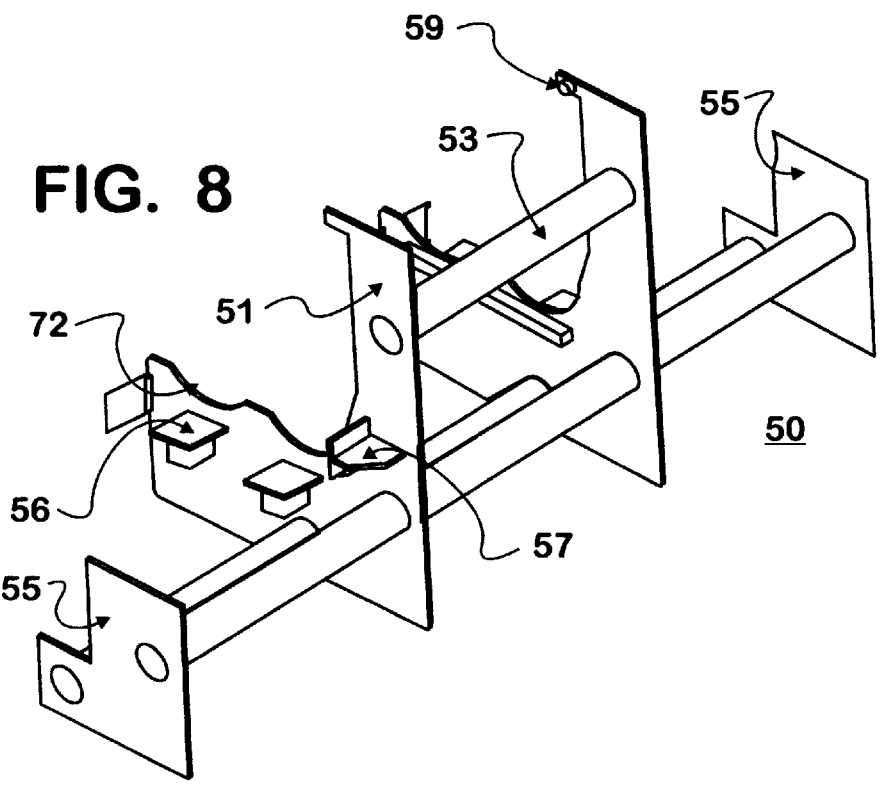
FIG. 8 is a rear perspective of the assembly jig of FIG. 7.
Figure 12:
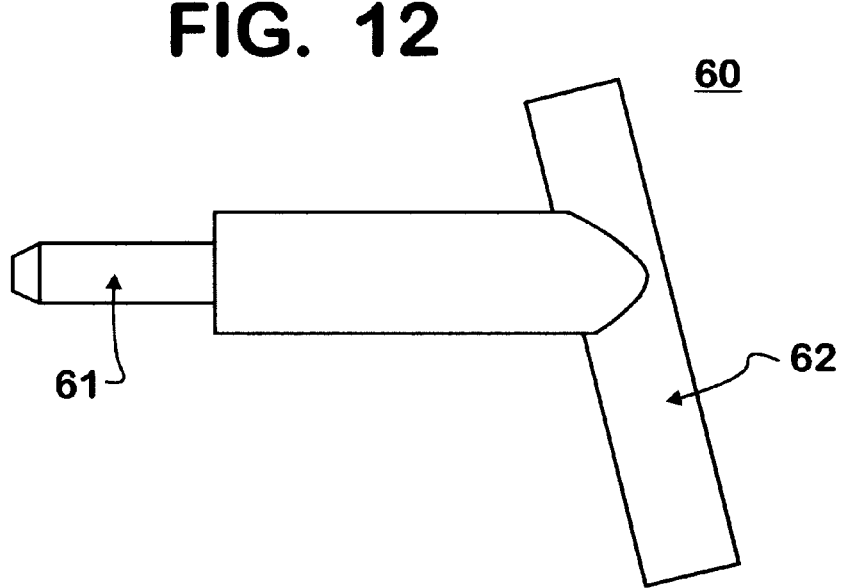
FIG. 12 is a side view of an assembly tool used for installation of the air tank assemblies of FIGS. 1 to 6 to a chassis of a vehicle.
Figure 11:
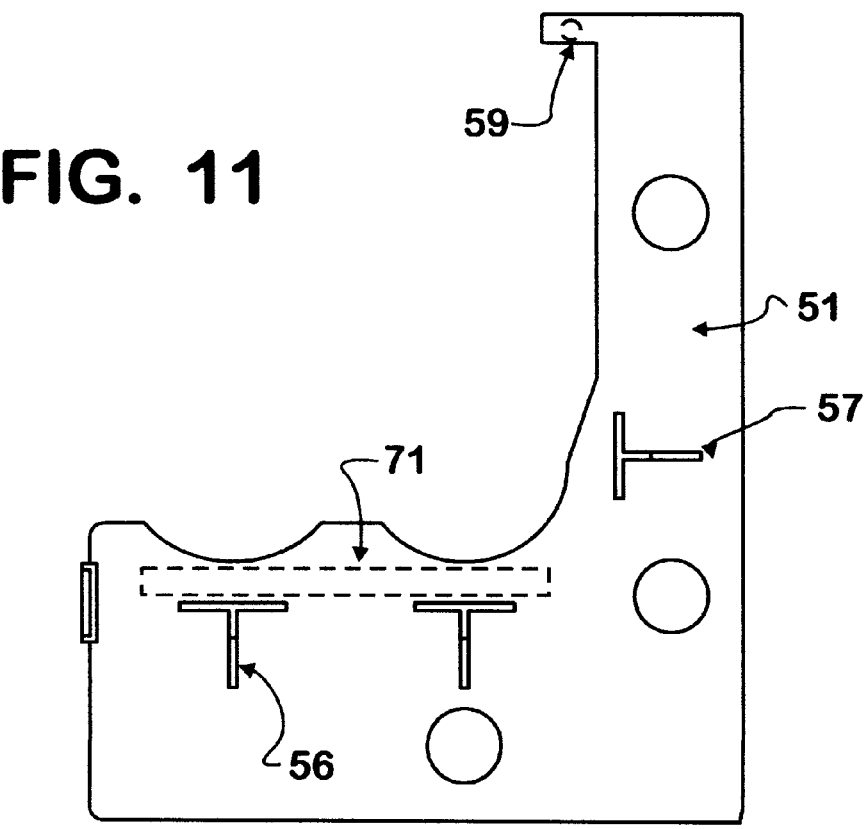
FIG. 11 is a side view of the assembly jig of FIG. 7.

There is shown in FIGS. 1 to 6, a modular air tank assembly 10 for a mobile vehicle 101, such as a heavy duty highway tractor trailer truck. FIGS. 7 to 12 show an assembly jig 50 that may be used in the process of assembling the modular air tank assembly 10 and an assembly tool 60 for installing the modular air tank assembly 10 to the vehicle 101.

The vehicle 101 has a chassis 102 comprised of two generally parallel frame rails 103 and cross members 105. There is a transmission and drive train 104 engaged to the chassis 102. Each frame rail 103 has an outer surface 103a to which components such as fuel tank engagement clamps 106 and the modular air tank assembly 10 are engaged. In the prior art, air tanks 11 were indirectly engaged to the chassis 102 through cross struts 109 (not shown) which were engaged between fuel tank engagement clamps 106 which were, in turn, engaged to each frame rail 103. As such installation of the air tanks 11 necessitated prior installation of the fuel tank engagement clamps 106 to the frame rails 103 and was required to be performed on the main vehicle assembly line. This required extra time on the main line with the associated extra final costs to vehicle 101 production. Since the air tank 11 location depended upon the longitudinal location of the fuel tank engagement clamps 106 along the chassis 102, the air tank 11 location would vary. There could be no standardization of air tank 11 installation, nor routing of air system tubing connections or plumbing, and valve operating pull strings. Plumbing and valve operating pull strings had to be installed on the main vehicle assembly line further adding to final vehicle production costs. The modular air tank assembly 10 of this invention removes the tie of the air tank 11 installation to fuel tank engagement location and allows installation of tank-to-tank plumbing and drain valve operation pull strings separate from the main vehicle assembly line.

The modular air tank assembly 10 is generally comprised of two brackets, one or two air tanks 11, retaining elements 14, a drain valve 15 for each air tank 11 or portion thereof, and a pull string 16 for operating each drain valve 15. The air tanks 11 are cylindrically shaped although that shape can vary.

The brackets 12 may be made of "C" cross sectional shaped steel stock and with each having a vertical surface 17 and an integral tank engaging surface 18. The invention may be made with one or two air tanks 11, depending upon the particular vehicle 101 transmission and drive train 104 geometry. In the one tank embodiment, the air tank 11 is designated a first air tank 11a. The first air tank 11a is engaged across and between the tank engaging surfaces 18 of the brackets 12 such that the brackets 12 are aligned parallel to each other. The first air tank 11a is engaged to each of the brackets 12 by a first retaining element 14a. The first retaining element 14a is contoured to engage against an outer surface of the first air tank 11a. The first retaining elements 14a are mechanically engaged at each end to the respective brackets 12. A first drain valve 15a is engaged to a lower section of the first air tank 11a. Opening of this first drain valve 15a while the first air tank 11a is pressurized will cause any moisture contamination in the first air tank 11a to be expelled. A first pull string 16a is engaged to open the first drain valve 15a. Pulling the pull string 16a will open the first drain valve 15a. When the first pull string is released, the first drain valve 15a will spring closed. The first pull string is engaged to a bracket 12 through pull string brackets 19. The pull string brackets 19 are engaged only to the brackets 12 and are positioned at various angles to facilitate lengthwise movement of the first pull string 16a through the pull string brackets 19. For instance, pull string brackets on an upper portion of the vertical surface 17 of the brackets are at 45-degree angles to allow the first pull string 16a to be run through a 90-degree turn. The first pull string 16a is strung independent of the chassis 102 to allow installation separate from the main vehicle assembly line. The vertical surfaces 17 of the brackets 12 are engaged to pre-drilled or punched engagement holes through an outer surface 103a of a frame rail 103.

The brackets 12 may be "J" shaped with the tank engaging surfaces 18 including a lower portion of the "J".

In the two tank 11 embodiment of the invention, a second air tank 11b is engaged across and between the tank engaging surfaces 18 of the brackets 12. When installed to the vehicle 101, the second air tank 11b is inboard of the first air tank 11a in relation to the frame rail 103 to which the vertical surfaces 17 of the brackets are engaged. The second air tank 11b is engaged to the brackets 12 by a second retaining element 14b for each bracket 12. The second retaining elements 14b are contoured to engage against an outer surface of the second air tank 11b and are mechanically engaged at each end to the respective brackets 12.

The first air tank 11a and the second air tank 11b are usually cylindrically shaped. In the two tank embodiment of the invention, the first air tank 11a is also known as the primary air tank 11a of the vehicle air system. The second air tank 11b contains two separate portions: a wet tank portion 21, and a secondary tank portion 22. A wet tank drain valve 15b and a secondary tank drain valve 15c are engaged to lower sections of the wet tank portion 21 and secondary tank portions 22, respectively. A second pull spring 16b is engaged to the wet tank drain valve 15b and a third pull string 16c is engaged to the secondary tank drain valve 15c to operate the valves. The wet tank drain valve 15b, the secondary tank drain valve 15c, the second pull string 16b, and the third pull string 16c operate in a similar fashion as the first (primary) tank drain valve 15a and the first pull string 16a. The second pull string 16b and the third pull string 16c are engaged to the brackets 12 through string brackets 19 with no direct connection to the chassis 102. The wet tank portion 21 has an inlet fitting 23 for engagement to on air supply source of the air system. The air supply source is a vehicle engine driven air compressor. The wet tank portion 21 of the second air tank 11b has two wet tank outlet fittings 24. The primary air tank 11a and the secondary portion 22 of the second air tank 11b have inlet fittings 25 with check valves and outlet-to-air system fittings. The check valves allow air flow into but not out of the inlet fittings 25 of the primary air tank 11a and the secondary portion 22 of the second air tank 11b. Tubing 28 is engaged between the wet tank outlet fittings 24 and the inlet fittings 25 of the primary air tank 11a and the secondary portion 22. When the modular air tank assembly 10 is installed to the vehicle 101, tubing is engaged from the air supply source to the inlet fitting 23 of the wet tank portion 21. Tubing is engaged from the outlet-to-air system fittings to vehicle air operated components such as truck air brakes.

In the preferred embodiment, the wet tank outlet fittings 24 and the inlet fittings 25 and outlet-to-air system fittings are push-to-connect type fittings such as the type shown in U.S. Pat. No. 5,583,120 which is incorporated by reference. These push-to-connect fittings, also known as quality connect fittings, are important to the preferred embodiment because of reduction in modular tank air assembly 10 production time.

The modular air tank assembly 10 may be assembled as follows. This assembly process is a marked improvement over the prior art in that it involves a significant decrease of the amount of installation time required on the main vehicle assembly line. The process of assembling and installing the modular air tank assembly 10 to the mobile vehicle 101 is comprised of two main steps. The first step involves assembling the modular air tank assembly 10 separate from the main assembly line. The second main step involves installing the modular air tank assembly 10 to the vehicle 101 on the main assembly line. The first main step of assembling the modular air tank assembly 10 is comprised of the following substeps. The two brackets 12 are held in a vertical position with the vertical surfaces 17 being upright, and the brackets 12 being parallel. The first air tank 11a is lowered onto the horizontal tank engaging surfaces 18 of the brackets 12. The first air tank 11a is aligned across and between the brackets 12. In the preferred embodiment, an assembly jig 50 is used to maintain the brackets 12 in the upright position and allow for installation of the first air tank 11a as well as the second air tank 11b. The assembly jig 50 is comprised of two generally "L" shaped support surfaces 51 which are engaged to each other via upper cross beams 53 and lower cross beams 54. Each support surface 51 has a vertical support bracket 56 on a lower portion of the "L" shaped support surface 51. Each support surface 51 has a horizontal alignment bracket 57 on an upper portion of the L. There is an alignment plate 55 engaged to the end of the upper cross beams 53 and lower cross beams 54. When first air tank 11a, and additionally second air tank 11b, are lowered to the brackets 12 of the modular air tank assembly 10, the ends of the first air tank 11a and second air tank 11b are aligned against the alignment plate 55, so as to insure consistent lateral placement of the air tanks 11 onto the brackets 12 of the modular air assembly 10. The assembly jig 50 additionally may have upper magnets 59 engaged to the upper portion of the support surfaces 51 and lower magnets 71 engaged to the lower portion of the support surfaces 51. The upper magnets 59 and lower magnets 71 are used to assist in the gripping and alignment of the brackets 12 of the modular air tank assembly 10. The brackets 12 and the air tanks 11 are made of a ferromagnetic material which will adhere to the magnets 59 and magnets 71. The upper magnets 59 may be engaged on an inboard side of a horizontal extension of the upper portion of each support surfaces 51. Lower magnets 71 may be rectangular shape and located on an inboard side of a lower portion of each support surface 51. The length of the lower magnets 71 will depend upon whether it is a one-tank 11 embodiment or two-tank embodiment 11 with a first tank 11a and a second tank 11b. Once the first tank 11a is lowered and is sitting on the brackets 12, first tank 11a is engaged to the brackets 12 with a first retaining element 14a. The next step in assembling the modular air tank assembly 10 separate from the main assembly line is to engage a first string valve 15a to a lower section of the first air tank 11a. A first pull string 16a cooperating the first string valve 15a is engaged to the first string valve 15a. The first pull string 16a is strung along a bracket 12 independent of the chassis 102 of the vehicle 101. In the one-tank embodiment of this invention, the modular air tank assembly 10 is then installed to the vehicle 101 on the main assembly line by the following step. The modular air tank assembly 10 is moved to the assembly line and aligned with the vehicle 101. The vertical surfaces 17 of the brackets 12 are engaged to an outer surface of the frame rail 103. Two frame fasteners 123 are used for each bracket 12 to-frame-rail 103 engagement.

The two-tank modular air assembly is assembled by the further additional steps. The second air tank 11b is lowered to engage across and between the tank engaging surfaces 18 of the brackets 12. The second air tank 11b is engaged to the brackets 12 with the second retaining element 14b for each bracket 12. In this two-tank embodiment of the invention, the first air tank 11a is a primary air tank 11a of the vehicle air system. The second air tank 11b is divided into two portions: a wet tank portion 21 and a secondary tank portion 22. The next step is that a wet tank drain valve 15b is engaged to a lower portion of the wet tank portion 21. A secondary drain valve 15c is engaged to a lower portion of a secondary tank portion 22 of a second air tank 11b. A second pull string 16b for operating the wet tank drain valve 15b and a third pull string 16c for operating the secondary tank drain valve 15c are engaged to the valves. The second pull string 16b and the third pull string 16c are engaged along the brackets 12 independent of the chassis 102 of the vehicle 101. In one version of the one-tank and the two-tank embodiments of the invention, the lower portion of each support surface 51 of the assembly jig 50 has scalloped upper surfaces 72 for engaging the first air tank 11a and/or the second air tank 11b. The scalloped upper surfaces 72 provide a seat for the air tanks 11. There may be further steps in the assembling modular air tank assembly which would include connecting flexible tubing from the wet tank outlet fitting 24 to the inlet fitting 25 of the primary air tank 11a and the secondary air tank 22. Additionally, check valves are engaged to the inlet fittings 25 of the primary air tank 11a and the secondary portion 22 of the secondary air tank 11b, such that air can flow only into the primary air tank 11a and secondary portion 22. The use of push-to-connect type fittings in this arrangement allows for rapid installation separate from the main assembly line. Once modular tank assembly 10 of the two-tank embodiment of the invention is moved to the main assembly line, the assembly 10 is installed as follows. An assembly tool 60 is used for engaging each bracket 12 to a frame rail 103. The two assembly tools 60 are used to carry the modular air tank assembly 10 to the main vehicle assembly line. The assembly tool 60 has engagement members 61 which are inserted into bolt holes on the vertical surface 17 of each of the brackets 12. Handles 62 of the assembly tool 60 are engaged to the engagement members 61. The handles 62 are used to carry the modular air tank assembly 10 to the main vehicle assembly line. The engagement members 61 of the assembly tool 60 are then inserted into predrilled holes in the outer surface 103a of the frame rail 103. The engagement members 61 are used to pin the vertical surfaces 17 of the brackets to the frame rail 103. The engagement members 61 of the assembly tool 60 are cylindrically shaped with tapered ends opposite that end attached to the handle 62 and the engagement members 61 have an exterior diameter corresponding to an inner diameter of the predrilled bolt holes in the frame rail 103. Following installation of permanent fasteners between the vertical surface 17 of the brackets 12, assembly tools 60 are removed from the frame rail 103 and the brackets 12 by pulling on the handles 62.

As described above, the modular air tank assembly 10 of the present invention and the method of assembly and installation of modular air tank assembly 10 to a vehicle 101 provide a number of advantages, some of which have been described above and others of which are inherent in the invention. Also modifications may be proposed to the modular air tank assembly 10 of the present invention and the method of assembly and installation of modular air tank assembly 10 to a vehicle 101 without departing from the teachings herein. Accordingly, the scope of the invention is only to be limited as necessitated by the accompanying claims.

We claim:

1. A modular air tank assembly for a mobile vehicle with a chassis comprised of two frame rails and an air system supplying air operated equipment, comprising:
    (a) two brackets, each having a vertical surface and an integral tank engaging surface;
    (b) a first air tank engaged across and between said tank engaging surfaces of said brackets such that said brackets are aligned parallel to each other;
    (c) said first air tank being engaged to said brackets by a first retaining element for each said bracket;
    (d) said first retaining elements being contoured to engage against an outer surface of said first air tank and said first retaining elements being mechanically engaged at each end to said respective bracket;
    (e) a first drain valve engaged to said first air tank;
    (f) a first pull string for operating said first drain valve;
    (g) said first pull string engaged to one of said brackets independent of the chassis; and
    (h) said vertical surfaces of said brackets engaged to a frame rail.

2. The modular air tank assembly of claim 1, wherein:
    (a) said brackets are "J" shaped with said tank engaging surface including a lower curved portion of said "J" brackets.

3. The modular air tank assembly of claim 2, further comprising:
   (a) A second air tank engaged across and between said tank engaging surfaces of said "J" brackets;
   (b) said second air tank is inboard of said first air tank in relation to the frame rail;
   (c) said second air tank being engaged to said "J" brackets by a second retaining element for each said "J" bracket; and
   (d) said second retaining elements being contoured to engage against an outer surface of said second tank and said second retaining elements being mechanically engaged at each end to said respective "J" brackets.

4. The modular air tank assembly of claim 3, wherein:
   (a) said first air tank and said second air tank are cylindrically shaped.

5. The modular air tank assembly of claim 4, wherein:
   (a) said first air tank is a primary air tank of the vehicle air system;
   (b) said second air tank contains a wet tank portion and a secondary tank portion;
   (c) a wet tank drain valve engaged to said wet tank portion;
   (d) a secondary tank drain valve engaged to said secondary tank portion;
   (e) a second pull string for operating said wet tank drain valve;
   (f) a third pull string for operating said secondary tank drain valve; and
   (g) said second pull string and said third pull string engaged to said brackets independent of the chassis.

6. The modular air tank assembly of claim 5, wherein:
   (a) said wet tank portion of said second air tank has an inlet fitting for engagement to an air supply source for the vehicle.

7. The modular air tank assembly of claim 6, wherein:
   (a) the air supply source is an air compressor of the air system of the vehicle.

8. The modular air tank assembly of claim 7, wherein:
   (a) said wet tank portion of said second air tank has two wet tank outlet fittings;
   (b) said primary air tank and said secondary tank portion of said second air tank have inlet fittings with check valves allowing only inlet air flow and outlet-to-air system fittings; and
   (c) tubing separately connects said wet tank outlet fittings to said inlet fittings of said primary air tank and said secondary portion of said second air tank.

9. The modular air tank assembly of claim 8, wherein:
   (a) said wet tank outlet fittings, said inlet fittings and said outlet-to-air system fittings of said primary air tank and secondary portion of said second air tank are push-to-connect type fittings.

10. A process of assembling and installing a modular air tank assembly to mobile vehicle with a chassis with two frame rails and an air system supply air operating equipment, comprising the steps of:
    (a) assembling a modular air tank assembly separate from a main vehicle assembly line, comprising the steps of:
       (i) holding two brackets, each with a vertical surface and an integral tank engaging surface with said vertical surfaces in upright positions and with said brackets being parallel;
       (ii) lowering a first air tank to engage across and between said tank engaging surfaces of said brackets;
       (iii) engaging said first tank to each of said brackets with a first retaining element, said first retaining elements being contoured to engage against and outer surface of said first air tank and said first retaining elements being mechanically engaged at each end to said respective brackets;
       (iv) engaging a first drain valve to said first air tank; and
       (v) engaging a pull string for operating said first drain valve to said first drain valve and engaged along said brackets independent of the chassis of the vehicle; and
    (b) installing said modular air assembly to a vehicle on a main assembly line, comprising the steps of:
       (i) moving said modular air tank assembly to the main vehicle assembly line; and
       (ii) engaging said vertical surfaces of said brackets to an outer surface of a frame rail.

11. The process of claim 10, wherein:
    (a) said step of holding said vertical surfaces of said brackets upright and said brackets parallel is accomplished using an assembly jig; and
    (b) said assembly jig is comprised of;
       (i) two generally "L" shaped support surfaces;
       (ii) said support surfaces are engaged through an upper and lower cross beam;
       (iii) each said support surface has a vertical support bracket on a lower portion of "L"; and
       (iv) each said support surface has a horizontal alignment bracket on an upper portion of the "L".

12. The process of claim 11, wherein said assembly jig further comprises:
    (a) a magnet on said upper portion of each said support surfaces of said jig for aligning said vertical surfaces of said brackets of said modular air assembly; and
    (b) a magnet on said lower portion of each said support surfaces of said jig for aligning said tank engaging surfaces of said brackets of said modular air assembly.

13. The process of claim 12, wherein:
    (a) said magnets on said upper portion of each said support surface is engaged to on an inboard side of a horizontal extension of said upper portion of each said support surface.

14. The process of claim 13, wherein:
    (a) said magnet on said lower portion of each said support surface is rectangular shaped and located on an inboard side of said lower portion of each said support surface.

15. The process of claim 14, wherein said step of assembling a modular air tank assembly separate from a main vehicle assembly line, further comprises the steps of:
    (v) lowering a second air tank to engage across and between said tank engaging surfaces of said brackets;
    (vi) engaging said second tank to each of said brackets with a second retaining element, said second retaining elements being contoured to engage against an outer surface of said second air tank and second retaining elements being mechanically engaged at each end to said respective brackets;
    (vii) said first air tank is a primary air tank of the vehicle air system;
    (viii) said second air tank contains a wet tank portion and secondary tank portion;
    (ix) engaging a wet tank drain valve to said wet tank portion and secondary tank drain valve to said secondary tank portion; and
    (x) engaging a second pull string for operating said wet tank drain valve and a third pull string for operating said secondary tank drain valve, said second and third pull strings engaged along said brackets independent of the chassis of the vehicle.

16. The process of claim 15, wherein:
(a) said lower portions of each said support surface have scalloped upper surfaces for providing lateral support to said first air tank and said second air tank.

17. The process of claim 16, wherein:
(a) said brackets of said modular air tank assembly are "J" shaped with said tank engaging surface including a lower curved portion of said "J" brackets.

18. The process of claim 17, wherein:
(a) said wet tank portion of said second air tank has an inlet fitting;
(b) said wet tank portion has two wet tank outlet fittings; and
(c) said primary air tank and said secondary air tank portion have inlet fittings.

19. The process of claim 18, wherein said step of assembling a modular air tank assembly separate from a main vehicle assembly further comprises the steps of:
(xi) connecting check valves to said inlet fittings of said primary air tank and said secondary portion of said second air tank such that air can only flow into said inlet fittings of said primary tank and said secondary portion; and
(xii) connecting flexible tubing from said wet tank outlet fittings separately to said inlet fittings of said primary air tank and said secondary portion.

20. The process of claim 19, wherein:
(a) said primary air tank and said secondary portion have outlet fittings for engagement to the air system of the vehicle.

21. The process of claim 20, wherein said step of installing said modular air assembly to a vehicle on a main assembly line further comprises the steps of:
(xiii) said wet tank outlet fittings, said inlet and outlet fittings of said primary air tank and said secondary portion of said second air tank are push-to-connect type fittings.

22. The process of claim 21, wherein said step of installing said modular air assembly to a vehicle on a main assembly line further comprises the steps of:
(iii) connecting flexible tubing from an air compressor of the air system of the vehicle to an inlet fitting of the wet tank portion; and
(iv) connecting flexible tubing from said outlet fittings of said primary air tank and said secondary tank portion of said second air tank to air operating equipment of the vehicle.

23. The process of claim 22, wherein said step of installing said modular air assembly to a vehicle on a main assembly line further comprises the steps of:
(v) inserting an engagement member of an assembly tool into bolt holes on said vertical surface of each said brackets, each said assembly tool having a handle engaged to said engagement member to allow said modular air tank assembly to be pinned to the frame rail during said step of engaging said vertical surfaces of said brackets to an outer surface of the frame rail, said engagement members of said assembly tools being cylindrically shaped with a tapered end opposite said handles and said engagement members having an exterior diameter corresponding to an inner diameter of bolt holes through the frame rail.

* * * * *